United States Patent [19]

Schilling

[11] Patent Number: 4,937,973

[45] Date of Patent: Jul. 3, 1990

[54] INITIAL-PLANT-GROWTH BODY

[75] Inventor: Frank Schilling, Alveslohe, Fed. Rep. of Germany

[73] Assignee: Edm. Romberg & Sohn (GmbH & Co.) KG, Ellerau, Fed. Rep. of Germany

[21] Appl. No.: 251,353

[22] Filed: Sep. 30, 1988

[30] Foreign Application Priority Data

Oct. 2, 1987 [DE] Fed. Rep. of Germany ....... 3733805

[51] Int. Cl.$^5$ ............................................. A01G 9/02
[52] U.S. Cl. .......................................... 47/66; 47/64; 47/77
[58] Field of Search .................. 47/1 A, 74, 32, 9, 25, 47/62–65, 79–83; 229/100, 6 R

[56]  References Cited

U.S. PATENT DOCUMENTS

| 3,823,508 | 7/1974 | Takehara | 47/63 |
| 3,835,584 | 9/1974 | Shimazu | 47/64 |

FOREIGN PATENT DOCUMENTS

| 537047 | 4/1945 | Fed. Rep. of Germany | 47/74 |
| 69365486 | 1/1970 | Fed. Rep. of Germany |  |
| 2307732 | 8/1974 | Fed. Rep. of Germany |  |
| 2827524 | 1/1980 | Fed. Rep. of Germany |  |
| 2852286 | 6/1980 | Fed. Rep. of Germany |  |

Primary Examiner—Robert A. Hafer
Assistant Examiner—Lynda M. Cofsky
Attorney, Agent, or Firm—Fay, Sharpe, Beall, Fagan, Minnich & McKee

[57] ABSTRACT

A plant growth body for germinating seeds for promoting the development of a root system for a cutting is constructed from a plurality of corrugated layers. Each corrugated layer has a plurality of parallel ridges and valleys that form channels extending between the adjacent ridges. When the corrugated layers are stacked one on the other, the plant growth body is formed so that the channels extend through the body. The material of the corrugated layers is penetrable by the roots so that the roots can penetrate successive ones of the corrugated layers and channels respectively. Further, the material of the corrugated layers preferably promotes capillary liquid flow through the plant growth body so that the roots are supplied with water.

32 Claims, 4 Drawing Sheets

INITIAL-PLANT-GROWTH BODY

BACKGROUND OF THE INVENTION

1. Field of the Invention

The invention relates to a body or ball for, in general, the cultivation of plants, in particular for initiating plant growth, the body or ball being adapted to receive at least one plant element such as a seedling, cutting, seed, or likewise for rooting or root development purposes comprising a channel system constructed therein.

Initiating the growth of plants by means of such bodies or balls is a facet of horticulture and is generally carried out by large and highly qualified special enterprizes. In the latter using large-scale or industrial methods plant cuttings, seedlings or seeds are stuck into or applied to growth bodies, which are kept in a wet or moist environment. The growth bodies are particularly intended for the initial rooting of the seedlings, cuttings, seeds, etc. When the latter have acquired an adequate degree of root system, they are forwarded with the rooted bodies or balls to production enterprizes, where the bodies with the rooted young plants are set for further cultivation either in sales containers such as pots or in the open.

2. Prior Art

In known bodies of the aforementioned type used for plant culture (DE-OS No. 28 52 286, DE-OS No. 28 27 524) special mechanical working of the substrate material by punching, milling, drilling, sticking or cutting is required for forming the channel or drainage system. The production of such one-piece, relatively massive bodies is expensive as regards materials and labour and therefore cost-intensive. Mechanical working leads to relatively thick channel walls, which leave a relatively large volume of the substrate material. As a result of their structure and when using conventional substrate materials, particularly totally synthetic foam, the known bodies are completely saturated with water, so that hydroroots are formed which are unsuitable for initial growth and which tend to rot.

Other known initial plant-growth bodies which do not have channels are made from flexible foam, a foam-flock composite with punched slits for receiving the cuttings or seeds (German Utility Model No. 69 365 486), or a substrate mixture comprising peat, humus and foam flocks (DE-OS No. 23 07 732). The porous or cellular structure of such initial growth bodies leads, during rooting, to an inadequate air exchange from the outside to the inside, i.e. between the individual cells. However, in the known bodies a fine-porous structure is required in order to permit a capillary spread of the water. With air exclusion with respect to the roots, the pores or the structure become filled with water. Inadequate ventilation of roots leads to rotting thereof and to impediment of growth. Initial growth bodies made from foams cannot be composted.

Objects of the Invention

The main object of the present invention is to provide an easily handlable initial-plant-growth body, which can be manufactured particularly inexpensively and whose structure ensures in simple manner a sterile and constant optimum nutrient structure, which permits a plurality of applications.

SUMMARY OF THE INVENTION

In conjunction with the features of the initially mentioned initial-plant-growth body, this task is solved in that the channels are formed by the arrangement in layer form of corrugated layers which are wavy in profile, form channel walls and can be penetrated by roots of the plant element.

Through the arrangement in layer form or stacking of the corrugated layers/the overall body is given a high strength and in a very simple and inexpensive manner (air) channels open at at least one side are formed on the outer surfaces of the body, so that it is possible to achieve, in particular, a very high air proportion of the overall body compared with the material proportion of the channel walls. The body has a low dry weight. The corrugated layers form successive channel layers, each of which has a group of at least partly parallel oriented air channels. In the plane of each channel layer there can be an advanced root spreading or propagation. In accordance with and dependent on the plant element whose growth is to be initiated, it is possible by the number, size of the corrugation and/or orientation of the successive corrugated layers to obtain and/or construct in a very marked form and in simple manner a desired root structure. The size of the channel cross-section is determined by the size of the corrugations of the corrugated layers and optionally by a partial engagement of said layers in one another. As a result of the air-voluminous corrugated channel structure ensuring forced ventilation, an accumulating wetness accompanied by air exclusion is avoided, which wetness would lead to the rotting of the plant element roots. With the stacked corrugated layers it is possible to obtain a very space- and material-saving structure of the body which, unlike in the case of the known initial-growth bodies, even avoids undesired water saturation if the body is temporarily placed in water or is over-watered. Root growth preferably takes place in the channel air saturated with moisture, roots penetrating the corrugated layers and grow through the same into the next channel. It is also very easy for roots to spread out between two adjacent corrugated layers transverse to the longitudinal extension of the corrugations. In the initial-growth bodies according to the invention, thin ramified roots form, which as soil roots are particularly suitable for subsequent propagation and growth in soil areas. The body structure ensures constant growth conditions, unchanged material characteristics of the body and sterility. Requirements for initial-growth bodies are, in particular, an easy, but controlled (dosed) water absorption, a structure retaining moisture for a long period, a nutrient medium favouring the growing-through of roots, an adequate ventilation of the roots and, linked therewith, a suitably stable relationship between the air and water space parts, a constant substrate quality, the maintenance of the sterility of the body material, the use of inexpensively available body material, good and stable standing characteristics of the body on greenhouse tables, shelves, etc., and the avoidance of a high weight of the body. All these objectives are achieved as a result of the body structure according to the invention.

In a particularly advantageous development of the invention the channel walls at least partly comprise a liquid-sucking capillary material, which contributes to a very favourable moisture balance of the body structure with uniform drainage. Compared with the channel diameter, the channel walls can be very thin and, as a result of the stability-ensuring corrugated layer structure, perferably are made from a soft material having a good capillary effect.

The corrugations of adjacent layers with the same corrugation phases can engage along parallel arranged corrugation valleys or ridges or, in an appropriate manner, such as e.g. by adhesion, fastening or surrounding the body with a holding means, can be joined together in order to obtain maximum channel cross-sections. The fixing measures mentioned in merely exemplified manner can be provided in general terms for holding together the layer structure of a body, according to the invention.

Adjacent corrugated layers with aligned corrugations can appropriately also be displaced in the corrugation phase and therefore displaced or offset parallel to one another, so that with the same corrugation layers it is possible to provide different channel cross-sections of desired size. In order to obtain a desired channel structure or size, same or adjacent corrugated layers, in particular with aligned corrugations, can also have different corrugation phases. The corrugation phase difference or the extent of the displacement can, in each case, lead to a more or less significant, tooth-like engagement of adjacent corrugated layers, so that it is possible to obtain very easily a desired channel volume and also give the structure a particular strength.

An advantage of the corrugated layer structure of the initial-growth body is that in simple manner layers with identically oriented channels can be formed over the entire body. Corrugated layers can equally advantageously be turned with respect to one another as regards their corrugation directions and in particular by an alternating 90° angle, so that then there are different channel orientations in adjacent corrugated layers, of optionally openly interconnected channels. Thus, a desired spatial propagation zone and/or a desired growth direction is predetermined in simple manner for root growth purposes.

According to a special construction according to the invention stacking or layering of the body with corrugated layers is formed from at least one one-piece corrugated material blank, such as a corrugated material web folded over in leporello or concertina-like manner by 180° on facing body surfaces. Such a body can be produced particularly easily. It is more especially advantageous that it is only necessary to fix the material or connection edge at the start or finish of a corrugated material web folded in the body form by e.g. adhesion or fastening in order to hold together adequately firmly the body layers. Appropriately the fold lines are parallel to the corrugation ridges or valleys. Through the nesting of two webs folded over in leporello-like manner at right angles to one another and in particular under an angle of 90°, a body is obtained with corrugated layers with the corrugation directions at right angles to one another.

According to a special construction of the invention between adjacent corrugated layers there is provided a substantially planar covering layer covering the same in flat manner and forming channel walls. As a result of the stacked layer structure of the body, adjacent corrugated layers can engage on one another by means of a common covering layer. This leads to a particularly simple, material-saving and stability-ensuring structure. The covering layers are made from a material which is penetratable by roots.

It is particularly advantageous to form the channel walls or layers from a soft and/or spongy cellulose or ground-wood paper. Screenings or bogus paper material, inexpensively available as a waste aproduct are particularly suitable. Through the construction of the body from paper layers, in an advantageous manner a biodegradable, recyclable and/or compostable product is obtained, so that environmentally friendly disposal is ensured. The aforementioned materials are particularly suitable for producing the structure according to the invention in that, as is known per se from the corrugated board industry, the corrugated layers are produced in the form of corrugated board layers. For the production of paper bodies it is possible to use a single or multiple-layer corrugated web optionally comprising covering or intermediate layers and which, as described hereinbefore, can more particularly be brought together in leporello-like manner. A plurality of initial-plant-growth bodies or blocks may also be punched or cut in the desired shape from a material web or a material web composite. Said paper layers have the advantage of forming very soft and/or very thin channel walls with excellent capillary characteristics.

With regards to a very space-saving handling and particularly favourable transportation, a very advantageous construction according to the invention comprises the arrangement or structuring of the channel walls or corrugated layers in such a way that the body can be compressed into a flat form, accompanied by the reduction of the channel cross-sections. The corrugated layers, in such case, are made from a material which, as a result of the elastic force and resiliency inherent in it more especially only in the moist state, can be uprighted or raised accompanied by the formation of the channel. It is very simply achievable that the bodies in the dry state can be compressed flat to a fraction of the original height for transportation purposes and then they fold out and expand to their original form, optionally accompanied by the action of moisture, so that it can then receive the plant elements to be rooted.

According to a further development of the invention the corrugated layers are successively stacked perpendicular to the vertical orientation of the body and as a result a sandwich structure with horizontal channel layers is formed. The roots are forced, as a result of the limited resistance and high atmospheric humidity in the channels to spread into the marginal areas of the body and to spread out horizontally layer-by-layer following the penetration of the corrugated or covering layers. This effectively prevents or at least reduces substantially the formation of tap roots or hydroroots which occur in a moist medium and which are unsuitable for planting in the soil. It has even been found out that if the initial-plant-growth body is positioned partially in water, in contrast to known initial-growth bodies, there do not occur any disadvantageous consequences of surplus watering. The branch plant roots can spread, branch and ramify horizontally, whilst avoiding tap roots.

Channels of an initial-growth body according to the invention can at least partly be filled with a growth material such as soil, peat, etc., which encourages root formation. It has been found that such a material structure is particularly favourable for the initial growing of certain plants, which may not be watered over a long period. The growth material favours root growth in the channels, whilst the channel structure layer-covered with corrugated layers ensures branching and ramifying root growth over the entire area of the growth body.

In growth bodies with relatively thin and/or soft corrugated layers, it is possible to introduce cuttings, seeds or even seedlings non-destructively from closed layer or body outer surfaces. It is also possible to provide in simple manner on a body top surface a receptacle for a plant element. In particular, a hole or vertical punched reception slit is provided in the body for this purpose. It is particularly advantageous to form the punched slit as a cross-slit. This has proved to be particularly appropriate if the seedling is to be inserted into the body perpendicularly to the channel or corrugated layers. As a result of the structure of the body according to the invention, it is ensured that the punched slit makes it possible to insert cuttings of widely differing stalk thickness and the flaps formed on the surface through the cross slit give way resiliently inwards to the necessary extent and consequently fix the cutting reliably. In the case of a corresponding orientation of the body, the channels can also serve to receive the cuttings, seedlings or seeds.

According to a further development of the invention and independently of the channels formed by the corrugated layers, it is possible to form for additional root guidance punched slits or holes arranged round an insertion or reception area of a plant element, which emanate from the body top surface and extend substantially vertically therein. This is particularly appropriate in the case of an initial-growth body with horizontal corrugated layers or channels for facilitating vertical rooting. Thus, particularly weakly rooting seeds, seedlings or cuttings can grow not only horizontally, but also vertically.

As a result of its simple structure, the initial-growth body according to the invention can be constructed in virtually any shape. It is particularly advantageous for the body to be parallelepipedic, columnar, cylindrical and/or prismatic with a base facing the plant element reception side. Thus, the bodies can be very simply arranged in large manners on greenhouse tables and/or means carrying the same.

BRIEF DESCRIPTION OF THE DRAWINGS

Other and further objects of the present invention will be apparent from the following description and claims and are illustrated in the accompanying drawings which, by way of illustration, schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE PREFERRED EMBODIMENTS

Figure 1:
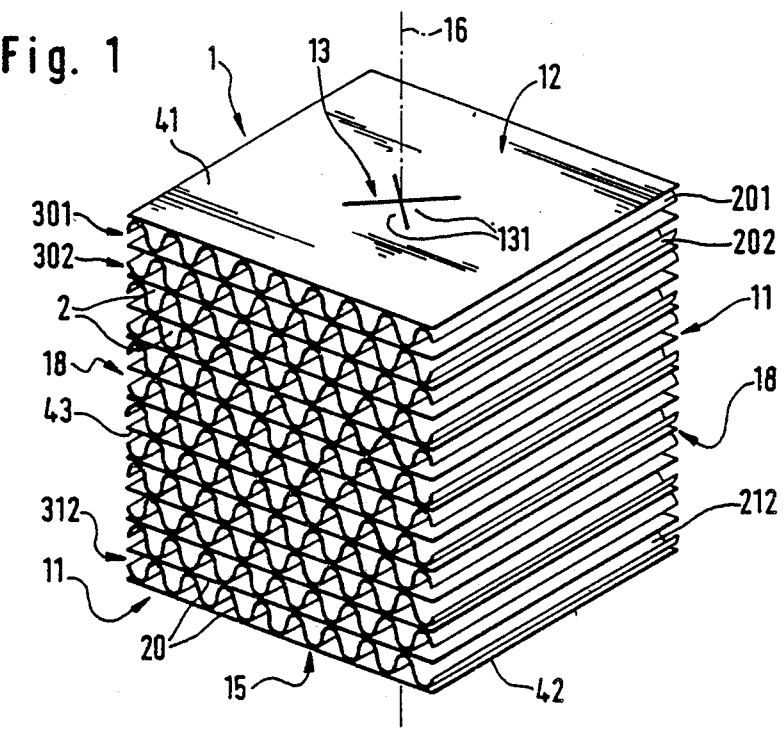
FIG. 1 shows an initial-plant-growth body according to the invention with covering layers.

An initial-plant-growth body 1 shown in FIG. 1 comprises horizontally stacked channel layers or groups 301 to 312 formed from corrugated layers 201 to 212 and arranged perpendicularly to the body axis 16. The corrugated layers are covered with planar intermediate or covering layers 41, 42, 43 and are advantageously joined thereto, optionally only in punctiform manner by a water-in-soluble adhesive. Adjacent corrugated layers each are interconnected by the common covering layer 43. A multi-layer high block is obtained, e.g. of several centimeters. The group 301, 302 . . . 312 of parallel channels 2 is formed with each corrugated layer. Each air channel 2 is open on the body outer surfaces 11 and forms a cleared passage between the same. The corrugated layers 201 to 212 are oriented in such a way that all the channels 2 pass in the same direction.

The covering layers 41, 42 and 43, as well as the corrugated layers 201 to 212 are made from a soft, spongy cellulose or ground wood (pulp) paper, particularly from screenings available as a recycling material. These paper layers, which together form a liquid-sucking capillary material structure which can be penetrated by roots 51 (FIG. 3) form walls 20 of channels 2. The corrugated layers 201 to 212 are advantageously made from a material with immanent elastic force and therefore resiliency, which optionally only occurs under moisture action, so that a not shown, flat collapsed body is folded up under the action of the resiliency. The corrugated shape of layers 201 to 212 is particularly suitable for producing the material resiliency.

Emanating from the top 12 of body 1 is punched a cross-slit 13 serving as a receptacle for a cutting 5 (FIG. 3) and produced to reach into a growth area 17 and which has fixing insertion flaps 131 along body axis 16. It is possible to insert into it cuttings of different stalk thickness into the desired growth area 17 for roots 51 to be grown.

Figure 3:
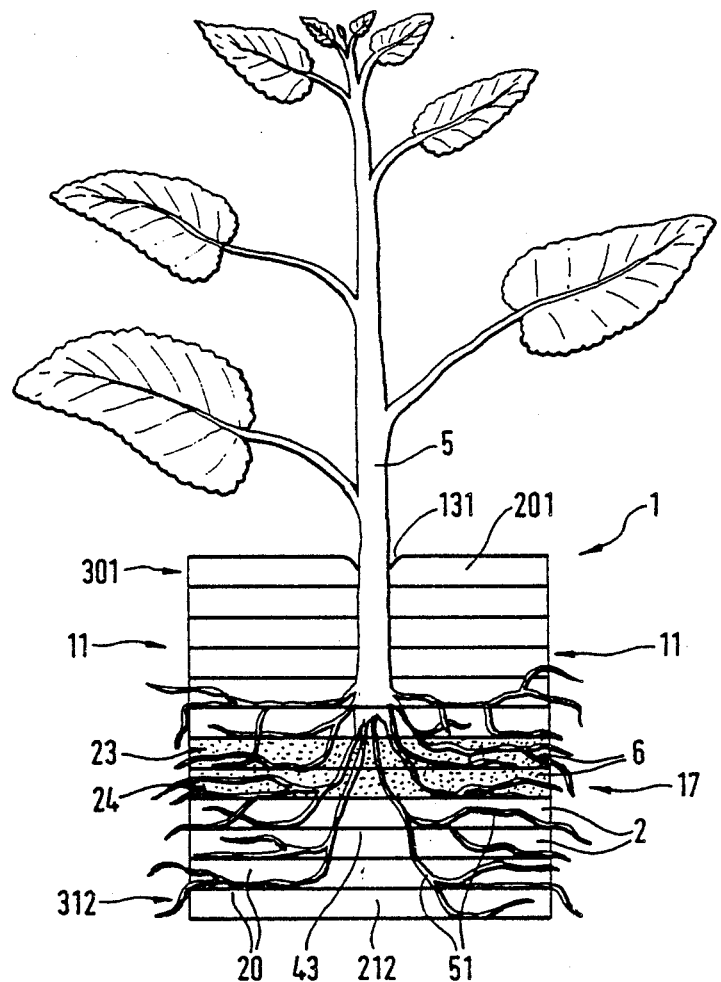
FIG. 3 shows in sectional form an initial-growth body according to the invention provided with a cutting.

As a result of the channel system of channel groups 301 to 312 formed by the corrugated layers 201 to 212 the roots 51 of the initial-growth-body 1 kept moist are forced to spread in directions of the channels 2 having a high atmospheric humidity into marginal areas of body 1. There is also a penetration of the walls 20 of the corrugated layers and the covering layers 41, 42, 43, as shown in FIG. 3. Thus, the roots are propagated and spread horizontally and vertically layer-by-layer.

Figure 2:
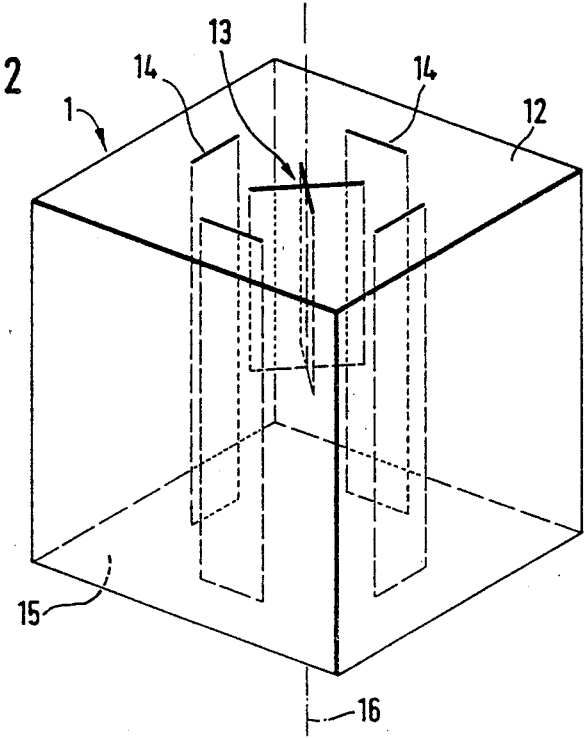
FIG. 2 shows the arrangement of slits in an initial-growth body according to the invention.

In a body 1 (shown without a channel system) according to FIG. 2 there are punched slits 14 extending vertically from the top surface 12 of body 1 into the bottom region and which in an embodiment corresponding to FIG. 1 preferably are located in the marginal areas of the body. These slits 14 are grouped around the cross-slit 13. They serve to bring about a particularly favourable, vertical root guidance, especially of weak roots, which initially spread horizontally.

The bottom of body 1 forms a standing or positioning base 15. Depending on the type of desired channel orientation, body 1 can also be placed on a surface 11 or an outer surface 18. If desired, on the opposite top surface of body 1 are provided receptacles for a plant element, particularly in the form of the aforementioned cross-slit. Particularly as shown in FIG. 1, it is especially advantageous for a structured body side 18 or a side 11 having channel openings to form recesses, depressions or insertion orifices.

It is clear that the body shown in FIG. 1 can be modified easily with respect to a different channel orientation of adjacent or differing channel groups. Thus, according to FIG. 5, channel groups 301 to 304 of adjacent corrugated layers can in particular extend at an angle of 90° to one another, by rotating adjacent layers about axis 16.

Figure 6:
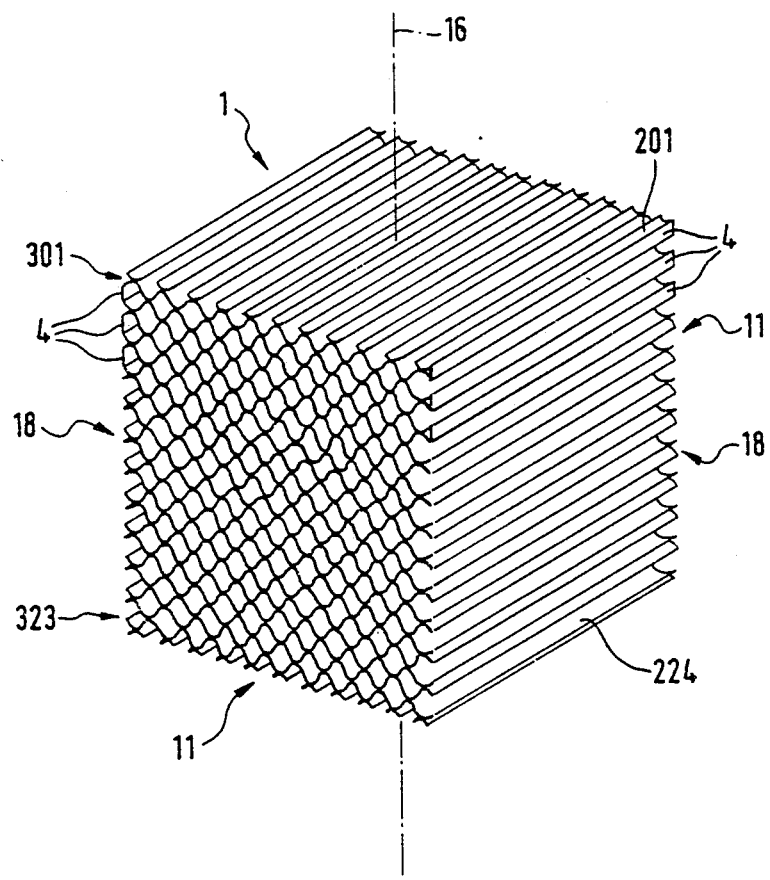
FIG. 6 shows an initial-growth body according to the invention with directly engaging corrugated layers.

An initial-plant-growth body 1 according to the invention with aligned corrugations according to FIG. 6 is constructed with directly engaging corrugated layers 201 to 224, unlike in the case of the growth body without covering layers described relative to FIG. 1. The layers 201 to 224 have substantially the same corrugation phase. The corrugations of adjacent layers are fixed to one another along parallel corrugation valleys or ridges, e.g. by adhesion using a water-insoluble adhesive. This leads to the formation of channel layers or groups 301 to 323, which have a honeycomb structure on the body outer surfaces 11.

Exemplified embodiments of the invention particularly involve reciprocally aligned corrugated layers with the same corrugation phase being reciprocally displaced or offset with respect thereto, so that the channel cross-sections are smaller corresponding to the phase displacement. The corrugations of adjacent layers partly interengage in tooth-like manner.

Initial-growth bodies according to the invention as shown in FIGS. 1, 3 and 6 can preferably be made from a one-piece corrugated material blank, such as a corrugated board material web folded over in leporello or concertina-like manner by 180° on opposite body surfaces 18. FIG. 6 shows such a folded material web through transitions, webs or the like designated by 4.

Figure 4:
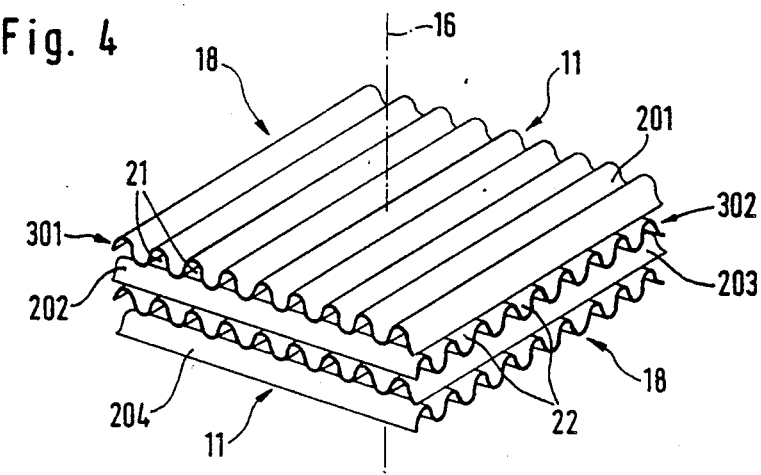
FIGS. 4 and 5 show arrangements of corrugated layers of initial-growth bodies according to the invention.

FIG. 4 shows in sectional detail four corrugated layers 201 to 204 of an initial-growth body according to the invention, in which the corrugation directions of adjacent corrugated layers 201/202, 202/203 or 203/204 are directed crosswise to one another at an angle of 90°. The corrugated layers are in direct engagement, i.e. there are no intermediate or covering layers and they are joined together e.g. by adhesion or by a holding means such as a band or a thin wrapping surrounding the complete body and which can be penetrated by the roots. The structure according to FIG. 4 comprises between two adjacent corrugated layers (e.g. 201 and 202) channel layers (e.g. 301 and 302), which have channels 21 and 22 at right angles to one another and are openly connected. Thus, roots can branch in channels 21, 22 without having to penetrate a channel wall.

Figure 5:
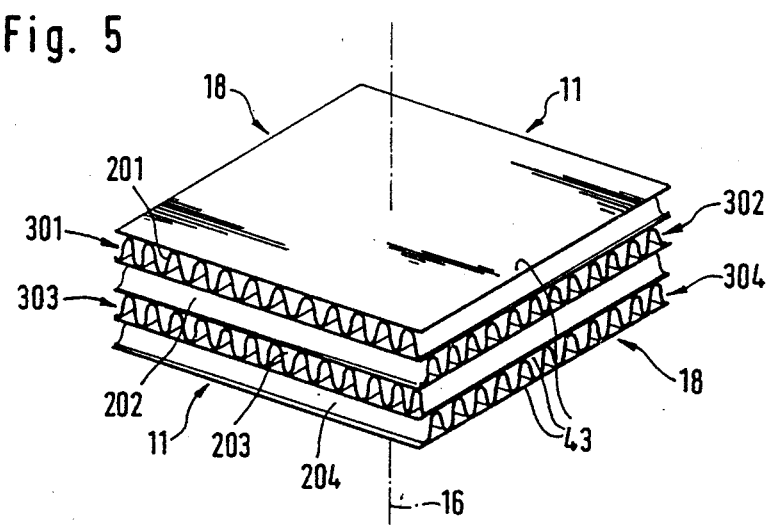

Bodies with corrugated layers arranged according to FIGS. 4 and 5 can advantageously be formed by nested folding of two corrugated webs arranged in leporello-like manner at an angle of 90° with respect to one another. Layers 201 and 203 or 202 and 204, respectively, are interconnected by means of a fold bridge (not shown in FIGS. 4 and 5) in the vicinity of the body outer surfaces 18 or 11, respectively.

Advantageously initial-plant-growth bodies according to the invention can be punched or cut from prefabricated plates, which comprise several corrugated layers, so as to give blocks or bodies having the desired size and shape.

FIG. 3 shows in an exemplified form channels 23 and 24, which are filled with a growth material, such as soil, peat, etc. which encourages root formation. As a result of this measure, in the case of certain plant types, root growth is favoured in the vicinity of the channels and at the same time there is a fine ramification of the roots in the vertical direction through the channel walls.

What is claimed is:

1. An initial plant growth body for receiving a plant element, comprising a body of stacked corrugated layers, each of said corrugated layers having a plurality of ridges defining a wavy profile and adjacent ones of said corrugated layers being in contact with one another, a plurality of channels formed between adjacent ones of said ridges of said corrugated layers; and said corrugated layers being formed of a material readily penetrable by roots of a plant element.

2. A plant growth body according to claim 1, wherein said channels have channel walls that are formed of a material promoting capillary liquid flow.

3. A plant growth body as claimed in claim 1, wherein each of said corrugated layers has a phase of corrugations, and wherein at least one of said corrugated layers is displaced with respect to another and adjacent one of said corrugated layers for offsetting said one corrugated layer with respect to said adjacent corrugated layer.

4. A plant growth body as claimed in claim 1, wherein each of said corrugated layers has a phase of corrugations, and the phase of each of said corrugated layers is the same.

5. A plant growth body as claimed in claim 1, wherein alternating ones of said corrugated layers are angularly displaced with respect to one another at an angle of 90 degrees so that the corrugations of adjacent ones of the stacked corrugated layers have extending directions that cross one another.

6. A plant growth body as claimed in claim 1, wherein at least one of said corrugated layers has a one-piece corrugated material blank formed from a web that is folded over a leporello or concertino-like manner.

7. A plant growth body as claimed in claim 1, wherein the material of the body has an inherent resilience so that the body can be flattened and subsequently uprighted by expansion to form the channels.

8. A plant growth body as claimed in claim 7, wherein the material of the corrugated layers swells by absorbing moisture to expand the channels.

9. A plant body as claimed in claim 1, wherein each of the corrugated layers has corrugations extending in a horizontal direction and adjacent corrugated layers are stacked one on the other to form a vertically stacked orientation of the body.

10. A plant growth body according to claim 1, wherein said channels are at least partly filled with a growth material for encouraging rooting.

11. A plant growth body as claimed in claim 1, wherein slits are formed to extend vertically downwardly from a top surface of the body into the interior of the body for receiving a plant element.

12. An initial plant growth body as claimed in claim 1, further comprising channel walls formed between adjacent ones of said ridges, wherein said channel walls are thin as compared with the cross-section of the channels.

13. An initial plant growth body as claimed in claim 1, further comprising channel walls extending between adjacent ones of said ridges, wherein the channel walls and corrugated layers are made from a soft spongy cellulose material.

14. An initial plant growth body for receiving a plant element, comprising a body of stacked corrugated layers, each of said corrugated layers having a plurality of ridges defining a wavy profile, a plurality of channels formed between adjacent ones of said ridges of said corrugated layers, said corrugated layers being formed of a material readily penetrable by roots of a plant element; and; at least one substantially planar covering layer arranged between and in contact with adjacent ones of said corrugated layers for covering the corrugated layers in a flat manner and forming channel walls extending between adjacent ones of said ridges.

15. A plant growth body as claimed in claim 14, wherein said channel walls are thin as compared with the cross-section of the channels.

16. A plant growth body as claimed in claim 14, wherein the channel walls and layers are made from a soft spongy cellulose material.

17. An initial plant growth body as claimed in claim 14, wherein said channels have channel walls that are formed of a material promoting capillary liquid flow.

18. An initial plant growth body as claimed in claim 14, wherein said corrugated layers are angularly displaced with respect to one another at an angle of 90 degrees so that the corrugations of adjacent ones of the corrugated layers have extending directions that cross one another.

19. An initial plant growth body as claimed in claim 14, wherein slits are formed to extend vertically downwardly from a top surface of the body into the interior of the body for receiving a plant element.

20. An initial plant growth body for receiving a plant element, comprising a body of corrugated layers, each extending horizontally and stacked together to form a vertical stack, each of said corrugated layers further having a plurality of ridges and having a corresponding plurality of valleys, wherein the ridges of one of said stacked corrugated layers are bonded to the valleys of an adjacent and upper one of said stacked corrugated layers with a water insoluble adhesive to form channels partly from each of said adjacent stacked corrugated layers.

21. A plant growth body as claimed in claim 20, further comprising at least one slit extending into the body from a top surface of the body for accepting a plant element, wherein said slit extends through a plurality of said corrugated layers, and the material of said corrugated layers is readily penetrable by the plant's element's roots.

22. A plant growth body as claimed in claim 21, wherein said material of said corrugated layers promotes capillary liquid flow throughout said body.

23. A plant growth body as claimed in claim 21, wherein said body has at least two slits extending vertically into the body from a top surface of the body, said slits intersecting one another to form flaps extending between said slits that yield resiliently to accept plant elements of varying stalks diameters.

24. A plant growth body as claimed in claim 20, wherein said corrugated layers are bonded to one another along the entire length of said ridges and valleys respectively.

25. A plant growth body as claimed in claim 20, wherein alternating ones of said corrugated layers are offset with respect to the corresponding adjacent ones of said corrugated layers in a direction transverse to a longitudinally extending direction of said valleys and ridges for adjusting the cross-sectional size of said channels.

26. An initial plant growth body for receiving a plant element, comprising a body of corrugated layers each extending horizontally and stacked together to form a vertical stack, means for maintaining said body of corrugated layers in said vertical stack, each of said corrugated layers further having a plurality of ridges and a corresponding plurality of valleys, wherein alternating ones of said corrugated layers are stacked crosswise with respect to the other of said corrugated layers, and said corrugated layers being formed of a material penetrable by the roots of the plant element.

27. An initial plant growth body according to claim 26, wherein said body has an opening extending into the body through at least one of said corrugated layers for receiving a plant element.

28. An initial plant growth body for receiving a plant element, comprising a body of corrugated layers extending generally horizontally and stacked together to form a vertically extending stack, means defining channels extending through said body including said corrugated layers having ridges and valleys forming channel side walls respectively and said channel means including at least one flat planar sheet extending generally horizontally between adjacent upper and lower ones of said corrugated layers for forming top and bottom channel walls respectively for each of said lower and upper stacked corrugated layers, and said corrugated layers being formed of a material that is penetrable by roots of a plant element.

29. A plant growth body as claimed in claim 28, wherein said corrugated layers are stacked in alternative orientation such that said ridges and valleys of said adjacent corrugated layers cross one another.

30. An initial plant growth body as claimed in claim 28, wherein said body has an opening extending into the body through at least one of said corrugated layers for receiving a plant element.

31. An initial plant growth body as claimed in claim 30, wherein said opening comprises at least two vertically extending slits intersecting one another to form flaps therebetween that yield resiliently to accept plant elements of varying stalk diameters.

32. An initial plant growth body as claimed in claim 31, wherein said slits are surrounded by at least one additional slit extending vertically into said body through at least one of said corrugated layers.

* * * * *